B. F. TEAL.
SPIRAL GEAR.
APPLICATION FILED SEPT. 12, 1907.
908,049.
Patented Dec. 29, 1908.
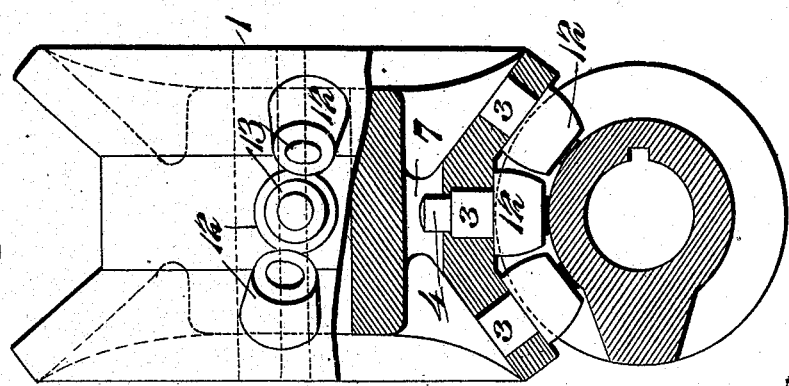
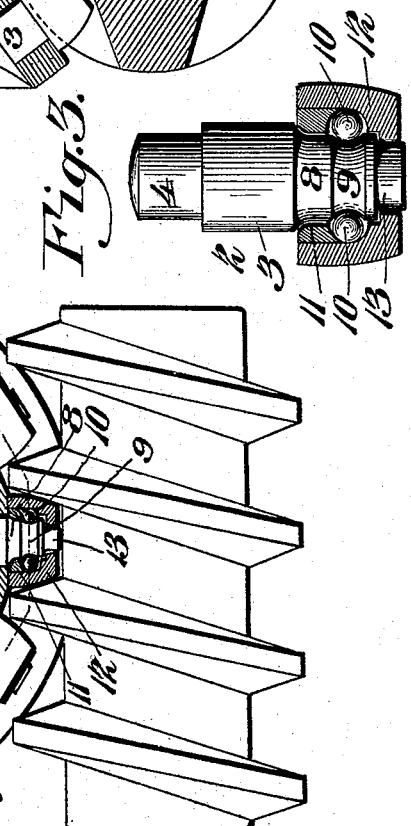

UNITED STATES PATENT OFFICE.

BENJAMIN FRANKLIN TEAL, OF GLENSIDE, PENNSYLVANIA.

SPIRAL GEAR.

No. 908,049.   Specification of Letters Patent.   Patented Dec. 29, 1908.

Application filed September 12, 1907. Serial No. 392,414.

*To all whom it may concern:*

Be it known that I, BENJAMIN FRANKLIN TEAL, a citizen of the United States, residing in Glenside, county of Montgomery, State of Pennsylvania, have invented a new and useful Spiral Gear, of which the following is a specification.

My present invention consists of a novel construction of a spiral gear in which a rotatable anti-friction tooth is employed which is adapted to be mounted on the periphery thereof.

One of the main objects of my invention is to reduce the high percentage of loss due to friction and thereby obtain increased efficiency and at the same time devise a structure which is capable of withstanding the strains and wear met with in practice and still be of simple construction and readily assembled and taken apart.

To the above ends my invention comprises an anti-friction gear in which a rotatable anti-friction tooth is employed which is so constructed that said tooth may be readily removed when desired.

It further consists of other novel features of construction, all as will be hereinafter fully set forth.

For the purpose of illustrating my invention I have shown in the accompanying drawings, one embodiment thereof which has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 1 represents a side elevation partly broken away, showing an anti-friction gear embodying my invention in operative relation with respect to a worm. Fig. 2 represents a sectional view of Fig. 1, certain parts thereof being broken away for the sake of clearness of illustration. Fig. 3 represents a sectional view showing, on an enlarged scale, an anti-friction tooth and its adjuncts in detached position.

Similar numerals of reference indicate corresponding parts in the figures.

Referring to the drawings:—1 designates a gear which is provided with a plurality of teeth 2 each of which is mounted on a stud or pin 3, which has its inner end reduced as indicated at 4 in order that said stud may have a driving fit in the apertures 5 and 6 of the gear 1, it being noted that the gear 1 has the apertures 7 therein, whereby a suitable drift may be inserted when it is desired to remove any of the central row of studs 3. The stud 3 has a reduced diameter as is indicated at 8, the shoulder thus formed being filleted in the usual manner, and adjacent this diameter said stud is provided with a concave recess or groove 9 with which the balls 10 are adapted to engage.

11 designates a bushing, the inner face of which is formed to give a uniform clearance on the portion 8 of the stud 3. The bushing 11 is formed to give a forcing fit in the roller 12. The roller 12 is internally constructed to form the outer half of the ball race and externally to give the form of the section of a solid tooth which is preferably an involute curve to comply with common practice.

It will be seen that in connection with the balls 10 the bushing 11 acts to retain the parts in assembled position.

As a convenience in assembling the complete tooth and the gear 1, an extension 13 on the stud 3 projects through the roller 12 sufficiently to allow the necessary pressure to be applied to force the stud 3 into its proper position in the gear 1 without bringing any strain on the roller 12 and thereby on the balls 10.

I wish to call special attention to the fact that in my novel construction the ball race is located substantially on the pitch circle of the gear.

For the purpose of illustration I have shown and described my invention as applied to a worm gear, but it is to be understood that it is equally applicable to any other form of spiral gear.

While there are several methods possible for assembling my device I prefer the method described in which the bushing 11 is slipped in place on the stud 3, its position being controlled by the filleted shoulder formed by the different diameters 8 and the body of the stud. This will form a retaining member or groove into which the balls are placed, and the roller 12 is then forced on to the bushing 11 far enough to give the necessary adjustment to prevent side motion on the balls. The complete tooth thus assembled is then forced into its place in the gear 1, using the extended portion 13 for driving without bringing strain on the roller or balls.

I wish it to be especially noted that in my novel construction of rotatable tooth gear the ball race is upon substantially the pitch circle x—x, passing through the points of contact of the roller 12 with the threads of the worm shaft.

It will be apparent from Fig. 2 that two or more teeth may be employed to replace the friction teeth of the ordinary worm wheel. The gear may be provided with apertures of any desired contour in the web member for the purpose of reducing the weight thereof and, if desired, strengthening ribs may also be employed, although such parts are not essential under all conditions.

It is to be understood that my invention is not limited to a worm gear but may be employed with any desired type of spiral gear in which it is desired to reduce the friction thereof with the co-acting mechanism.

It will now be apparent to those skilled in this art that I have devised a novel and useful construction of a spiral gear which embodies the features of advantage enumerated as desirable in the statement of invention and the above description, and while I have in the present instance shown and described a preferred embodiment thereof which gives in practice satisfactory and reliable results, it is to be understood that the same is susceptible of modification in various particulars without departing from the spirit and scope of the invention or sacrificing any of its advantages.

Having thus described my invention, what I claim as new and desire to secure by Letters Patent, is:—

1. In a gear, a central body, studs removably secured thereon, rollers carried by said studs, balls intermediate said rollers and studs, and bushings engaging said rollers and balls.

2. In a gear, a central body, studs removably secured thereon, rollers carried by said studs, balls intermediate said rollers and studs, and bushings engaging said roller and balls, said bushings, rollers, balls and studs forming a ball bearing.

3. In a gear, a central body, studs removably secured thereon, rollers carried by said studs, balls intermediate said rollers and studs, and bushings engaging said roller and balls, said bushings, rollers, balls and studs forming a ball bearing located on substantially the pitch circle of the gear.

4. In a gear, a central body, studs thereon, rollers through which one end of said studs extend, balls intermediate said rollers and studs, and bushings engaging said rollers and balls.

5. A spiral gear having teeth formed of a plurality of rotatable elements arranged angularly and radially on the face of said gear to conform to the teeth of the co-acting member.

6. A spiral gear having teeth formed of a plurality of rotatable elements arranged angularly and radially on the face of said gear to conform to the teeth of the co-acting member, said teeth being provided with ball bearings.

7. A spiral gear having teeth formed of a plurality of rotatable elements arranged angularly and radially on the face of said gear to conform to the teeth of the co-acting member, said teeth being provided with ball bearings located on substantially the pitch circle of the gear.

8. In a gear, a central body, studs removably secured thereon said body having apertures in rear of said studs, rollers carried by said studs, balls intermediate said rollers and studs, and bushings carried by said rollers and engaging said balls.

BENJAMIN FRANKLIN TEAL.

Witnesses:
C. D. McVay,
H. S. Fairbanks.